United States Patent
Viala

(10) Patent No.: US 11,655,345 B2
(45) Date of Patent: May 23, 2023

(54) NANOCOMPOSITE AND METHOD OF PRODUCING SAME

(71) Applicant: COMMISSARIAT A L'ENERGIE ATOMIQUE ET AUX ENERGIES ALTERNATIVES, Paris (FR)

(72) Inventor: Bernard Viala, Sassenage (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1082 days.

(21) Appl. No.: 15/584,567

(22) Filed: May 2, 2017

(65) Prior Publication Data

US 2017/0321018 A1 Nov. 9, 2017

(30) Foreign Application Priority Data

May 3, 2016 (FR) ..................... 16 54020

(51) Int. Cl.
| | | |
|---|---|---|
| *C08J 5/00* | (2006.01) | |
| *H01F 1/00* | (2006.01) | |
| *B82Y 30/00* | (2011.01) | |
| *B82Y 40/00* | (2011.01) | |

(52) U.S. Cl.
CPC .............. *C08J 5/005* (2013.01); *B82Y 30/00* (2013.01); *B82Y 40/00* (2013.01); *H01F 1/0063* (2013.01); *C08K 2201/01* (2013.01); *C08K 2201/011* (2013.01)

(58) Field of Classification Search
None
See application file for complete search history.

(56) References Cited

U.S. PATENT DOCUMENTS 3,766,096 A * 10/1973 Mastrangelo et al. ...................... H01L 45/1608
252/513
6,447,848 B1 9/2002 Chow et al.
7,485,366 B2 2/2009 Ma et al.
(Continued)

FOREIGN PATENT DOCUMENTS

EP 2 244 268 A1 10/2010

OTHER PUBLICATIONS

El-Gendy, A.a., et al. "The Synthesis of Carbon Coated Fe, Co and Ni Nanoparticles and an Examination of Their Magnetic Properties." Carbon, vol. 47, No. 12, 2009, pp. 2821-2828 (Year: 2009).*
(Continued)

*Primary Examiner* — Kevin E Yoon
*Assistant Examiner* — Ryan L Heckman
(74) *Attorney, Agent, or Firm* — Oblon, McClelland, Maier & Neustadt, L.L.P.

(57) ABSTRACT

Microelectronics and the manufacture of microelectronic components for an integrated circuit operating at a high frequency are disclosed. Production of micro-inductors having a high induction density and high quality factor, in particular at a usage frequency greater than 1 GHz, or even greater than 5 GHz, is disclosed. A nanocomposite 1 including magnetic alloy nanoparticles 10 at least partially includes a soft magnetic alloy, an insulating matrix 20, and insulating nanoparticles 30, the nanoparticles being supported in the matrix and the soft magnetic alloy nanoparticles being encapsulated by insulating nanoparticles.

20 Claims, 2 Drawing Sheets

(56) References Cited

U.S. PATENT DOCUMENTS

| | | | |
|---|---|---|---|
| 2005/0074600 A1 | 4/2005 | Ma et al. | |
| 2006/0115684 A1* | 6/2006 | Choi | H01F 10/007 428/812 |
| 2008/0268288 A1* | 10/2008 | Jin | G03F 7/0002 428/800 |
| 2012/0038532 A1* | 2/2012 | Yonetsu | H01Q 17/00 343/787 |
| 2013/0344237 A1* | 12/2013 | Guo | H01F 1/42 427/127 |
| 2016/0158800 A1 | 6/2016 | Viala et al. | |
| 2016/0159056 A1 | 6/2016 | Takacs et al. | |

OTHER PUBLICATIONS

Buschow K.H.J., de Boer F.R. (2003) Soft-Magnetic Materials. In: Physics of Magnetism and Magnetic Materials. Springer, Boston, MA (Year: 2003).*

Gonzalez-Fernandez, M.A., et al. "Magnetic Nanoparticles for Power Absorption: Optimizing Size, Shape and Magnetic Properties." Journal of Solid State Chemistry, vol. 182, No. 10, 2009, pp. 2779-2784 (Year: 2009).*

French Preliminary Search Report dated Feb. 14, 2017 in French Application 16 54020 filed on May 3, 2016 (with English Translation of Categories of Cited Documents and Written Opinion.

Yu A. Kotov "Electric explosion of wires as a method for preparation of nanopowders," Journal of Nanoparticle Research 5, Kluwer Academic Publishers, 2003, p. 12.

Helene Takacs et al. "Non-conductive ferromagnets based on core double-shell nanoparticles for radio-electric applications," SpringerPlus, DOI 10.1186/s40064-016-2099-3, 2016, pp. 9.

H.Takacs et al. "New Approach to Closely Spaced Disordered Cobalt-Graphene Polymer Nanocomposites for Non-Conductive RF Ferromagnetic Films," IEEE Transactions on Magnetics, vol. 51, No. 11, Nov. 2015, p. 4.

R. Ramprasad et al. "Magnetic properties of metallic ferromagnetic nanoparticle composites," Journal of Applied Physics, vol. 96, No. 1, Jul. 2004, pp. 1 2.

* cited by examiner

NANOCOMPOSITE AND METHOD OF PRODUCING SAME

TECHNICAL FIELD OF THE INVENTION

This invention relates to the field of microelectronics and more particularly the field of the manufacture of microelectronic components for an integrated circuit operating at a high frequency. It has an advantageous application in the production of inductors, and more particularly micro-inductors having a high induction density and high quality factor, in particular at a usage frequency greater than 1 GHz, or even greater than 5 GHz.

PRIOR ART

Indeed, the usage frequency of microelectronic components, and in particular of micro-inductors, is currently about 1 to 2 GHz.

At said frequencies, the use of magnetic alloy nanoparticles referred to as soft, the magnetocrystalline anisotropy of which is relatively low, appears to allow for the production of nanocomposites intended to be electrically insulating and having a high permeability and satisfactory frequency behavior (See the article by C. YANG et al., entitled "On-chip RF inductors with magnetic nanoparticles medium", published in 2011 in the "Solid-State Sensors, Actuators and Microsystems Conference (TRANSDUCERS)" review ($16^{th}$ International, IEEE, 2011, p. 2801-2804)).

However, said nanocomposites have a residual conductivity that is too high. With reference to FIG. 1, this conductivity issue is probably a result of the agglomeration of soft magnetic alloy nanoparticles 110 in the photosensitive resin 120 constituting the insulating matrix of the magnetic medium 100 proposed by C. Yang et al. More particularly, the nanoparticles 110 contacting each other would form electrical conduction pathways 130 (represented in FIG. 1 by curved double arrows) within the nanocomposite.

The length of said electrical conduction pathways 300 must be limited to a value that is less than 200 nm to prevent the formation of micro-currents induced above a usage frequency of 1 GHz. Two or three nanoparticles 100 must therefore be prevented from touching each other within the nanocomposite.

There is no known solution to date that can be used to achieve a sufficient level of electrical insulation of said nanoparticles.

The purpose of this invention is to at least partially overcome the aforementioned restriction. According to a first aspect, the purpose of the invention is to provide a magnetic material that is a good electrical insulator and that has significant high-frequency permeability. According to a second aspect, the purpose of the invention is to provide an industrial method for producing said magnetic material.

The term "good electrical insulator" is understood herein as having a resistivity that exceeds $10^3$ µOhm·cm, and advantageously exceeding $10^6$ µOhm·cm.

The term "significant permeability" is understood herein as having a relative permeability $\mu_R$ that is greater than 2, and advantageously greater than 10.

The term "high frequency" is understood herein as having a frequency that is greater than 1 GHz, and advantageously greater than 5 GHz, or even greater than 10 GHz.

The magnetic material should desirably dissipate little energy at a high frequency. For information purposes, the total magnetic losses should desirably have a loss angle δ, the tangent of which has a value less than $10^{-1}$, and advantageously less than $10^{-2}$.

SUMMARY OF THE INVENTION

In order to at least partially achieve this objective, the invention proposes a nanocomposite comprising:
   magnetic alloy nanoparticles at least partially comprised of a soft magnetic alloy and
   An insulating matrix supporting the magnetic alloy nanoparticles,
the nanocomposite substantially being such that it further comprises insulating nanoparticles supported by the matrix and inserted between the magnetic alloy nanoparticles.

The term "nanocomposite" is understood herein as a multiphase solid material, one of the phases of which has at least one dimension that is less than 1 µm.

The term "soft magnetic alloy nanoparticles" shall be understood hereinbelow as nanoparticles comprising a soft ferromagnetic material with a low magnetocrystalline anisotropy capable of becoming spontaneously magnetized when subjected to a low-strength external magnetic field; however, the action of creating or cancelling out the magnetization in this material requires less energy than for ferromagnetic materials with a higher anisotropy, referred to herein as hard. Soft ferromagnetic materials have a very low coercive field $H_C$ and high susceptibility, whereas hard ferromagnetic materials have a high coercive field and low susceptibility. The hysteresis loop of soft ferromagnetic materials is therefore narrower than that of hard ferromagnetic materials. The area shown within the loop corresponds to the hysteresis losses when the material performs a full cycle. These magnetic losses mainly occur in the form of heat emissions. They increase with the frequency and are problematic for a wide number of applications. It is therefore understood that soft ferromagnetic materials are used for applications working at high frequencies as their loop is narrower and losses are thus minimized. For concision purposes, soft magnetic alloy nanoparticles may be referred to hereinbelow as "soft particles".

The nanocomposite according to the invention thus constitutes a magnetic material that is a good electrical insulator and that has significant high frequency permeability. Indeed, the fact that the insulating nanoparticles are inserted between the magnetic alloy nanoparticles, results in the removal of the electrical conduction pathways (referenced 130 in FIG. 1) that are too long (length exceeding 200 nm). Compared to the nanocomposite proposed by C. Yang et al., the nanocomposite according to the invention has an equivalent permeability and improved electrical insulation.

The invention, according to its first aspect, is therefore particularly advantageous for the production of micro-inductors having a high induction density and high quality factor, in particular a high usage frequency.

According to one feature of the invention, at least one insulating nanoparticle comprises a core comprised of a ferromagnetic element, such as cobalt Co, iron Fe or nickel Ni, a first carbon or graphene shell encapsulating the core and a second polymer shell, such as polystyrene, encapsulating the first shell.

The nanocomposite according to this feature is characteristic in the sense that it comprises two separate populations of magnetic nanoparticles. The insulating nanoparticles according to this feature are jointly referred to as "hard ferromagnetic nanoparticles" as each of said nanoparticles comprises a core made of a ferromagnetic element known to have a magnetocrystalline anisotropy greater than that of soft magnetic alloys. Said hard ferromagnetic nanoparticles shall occasionally be called "hard particles" hereafter for concision purposes. Said hard particles advantageously contribute to the magnetic properties of the nanocomposite according to the first aspect of the invention, increasing its permeability while conserving its good electrical insulation capacity.

The second aspect of this invention relates to a method for producing a nanocomposite as described hereinabove. Said method is substantially such that it comprises:
- The preparation of a solution of magnetic alloy nanoparticles at least partially comprised of a soft magnetic alloy,
- The preparation of a stock solution of an insulating matrix,
- The preparation of a solution of insulating nanoparticles,
- A first mixing of the stock solution of the matrix and the solution of insulating nanoparticles,
- A second mixing of the solution of magnetic alloy nanoparticles and the first mixture, the preparation of the solution of magnetic alloy nanoparticles comprising the suspension of the magnetic alloy nanoparticles in a solvent by sonication.

A microelectronic component or device shall be understood herein as any type of device made using microelectronic means. In addition to devices intended for purely electronic purposes, said devices in particular include micromechanical or electromechanical devices (MEMS, NEMS, etc.) as well as optical or optoelectronic devices (MOEMS, etc.).

Other purposes, characteristics and advantages of this invention will appear upon reading the following description and its supporting figures. It is understood that other advantages can be incorporated thereto.

BRIEF DESCRIPTION OF THE FIGURES

The aims, purposes, characteristics and advantages of the invention will be better understood upon reading the detailed description of one embodiment thereof, which is illustrated by means of the following accompanying figures, in which.

Figure 1:
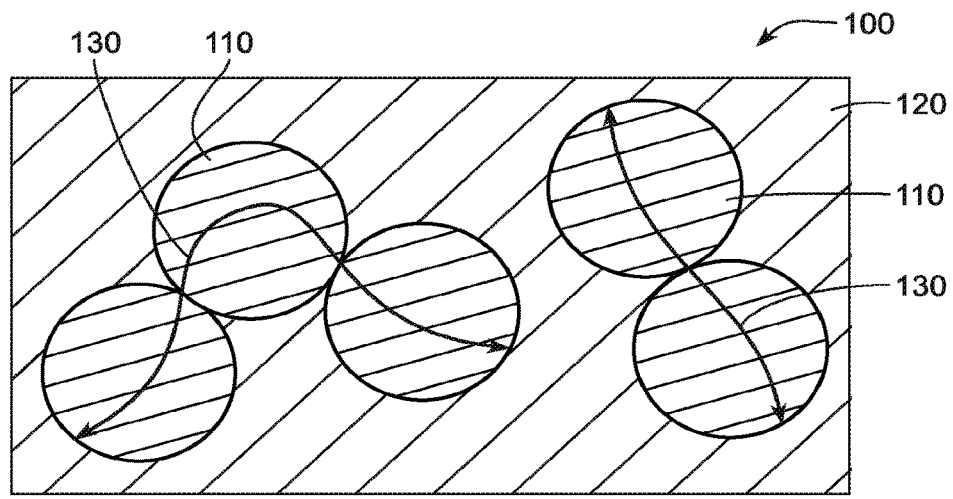
FIG. 1 shows a cross-sectional view of a portion of magnetic nanocomposite according to the prior art.

The drawings are provided by way of example and are not intended to limit the scope of the invention. They constitute diagrammatic views intended to ease the understanding of the invention and are not necessarily to the scale of practical applications. In particular, the thicknesses regarding the different layers are not necessarily representative of reality.

DETAILED DESCRIPTION OF THE INVENTION

In an optional manner, the invention according to its first aspect can have at least any one of the following optional characteristics:

The ratio of the diameter of the magnetic alloy nanoparticles over the diameter of the insulating nanoparticles is between 1 and 10, preferably between 2 and 4.

The diameter of the magnetic alloy nanoparticles is between 100 nm and 200 nm; therefore, a soft insulated particle does not create conduction pathways having a length that is greater than 200 nm and are sufficient in size to have a plurality of magnetic domains, thus encouraging the production of a nanocomposite with high permeability.

The diameter of the insulating nanoparticles is between 10 nm and 70 nm, preferably between 20 nm and 50 nm.

The magnetic alloy nanoparticles are comprised of an alloy chosen from among the following: a nickel- and iron-based alloy such as permalloy and supermalloy, an iron-based alloy, a cobalt-based alloy, and an iron- and cobalt-based alloy, said alloys potentially capable of containing one or more alloy additions, in particular chosen from among the following: aluminum Al, copper Cu, silicon Si, titanium Ti, tantalum Ta, molybdenum Mo, boron B, carbon C and nitrogen N.

The matrix comprises a non-conductive polymer, such as polystyrene, polybutadiene, polymethacrylate and polystyrene-methacrylate copolymers or any other polyethylene-, polyester-, polymethylene-, polyurethane-, polyvinylidene-, or polyepoxide-based polymer.

The nanocomposite has a form of at least one film having a thickness of between 0.1 µm and 100 µm, and advantageously between 1 and 20 µm and having a mass fraction of metal at least equal to 50% and advantageously 70% or even 90% and/or a volume fraction of metal at least equal to 15%, and advantageously 20% or even 25%.

In an optional manner, the invention according to its second aspect can have at least any one of the following optional characteristics:
- The solution of magnetic alloy nanoparticles has a mass concentration of between 0.01 and 0.05 g/mL, preferably equal to 0.025 g/mL, and/or the solution of insulating nanoparticles has a mass concentration of between 0.05 and 0.2 g/mL, preferably equal to 0.1 g/mL.
- The sonication power of the solution of magnetic alloy nanoparticles is between 100 and 250 W, preferably equal to 200 W, and the sonication time is less than 10 min, preferably equal to 2 min.
- The preparation of the solution of magnetic alloy nanoparticles takes place after the first mixing.
- The method further comprises the deposition of a film of the second mixture, in particular by spin coating and the drying of the film, in particular on a hot plate.
- According to one feature of the method, whereby each insulating nanoparticle comprises a core comprised of a ferromagnetic element such as cobalt Co, iron Fe or nickel Ni, a first carbon or graphene shell encapsulating the core and a second polymer shell, such as polystyrene, encapsulating the first shell, the preparation of the solution of insulating nanoparticles comprises:
  - the suspension of nanoparticles each comprising said core and said first shell in a solvent by sonication at a power between 50 and 150 W, preferably equal to 100 W, and for a time of less than 30 min, preferably equal to 10 min, then
  - the grafting of said second shell onto each nanoparticle previously suspended by the introduction of a functionalizing polymer comprising at least one styrene or anthracene termination, such as polystyrene, polybutadiene, polymethacrylate and polystyrene-methacrylate copolymers, while maintaining sonication at a power of between 50 and 150 W, preferably equal to 100 W, and for a time that is less than 30 min, preferably equal to 10 min.

In an optional manner, this feature of the invention according to its second aspect can also have at least any one of the following optional characteristics:

the first mixing of the stock solution of the matrix and the solution of insulating nanoparticles takes place by introducing the stock solution of the matrix into the solution of insulating nanoparticles, the sonication thereof being maintained at a power of between 50 and 150 W, preferably equal to 100 W, and for a time that is less than 30 min, preferably equal to 10 min;

the second mixing of the solution of magnetic alloy nanoparticles and the first mixture takes place within a lapse of time that is less than 10 min, preferably less than 3 min, after the preparation of the solution of magnetic alloy nanoparticles, the sonication of the first mixture preferably being maintained at a power of between 50 and 150 W, preferably equal to 100 W, and for a time that is less than 30 min, preferably equal to 10 min.

According to one feature of the method, sonication takes place by immersing an ultrasonic probe directly into the solution concerned.

The dimensional values or the ratio values provided below are understood as being values given to the nearest measurement error. These values can, for example, vary by plus or minus 5% without leaving the scope of the invention as claimed.

Figure 2:
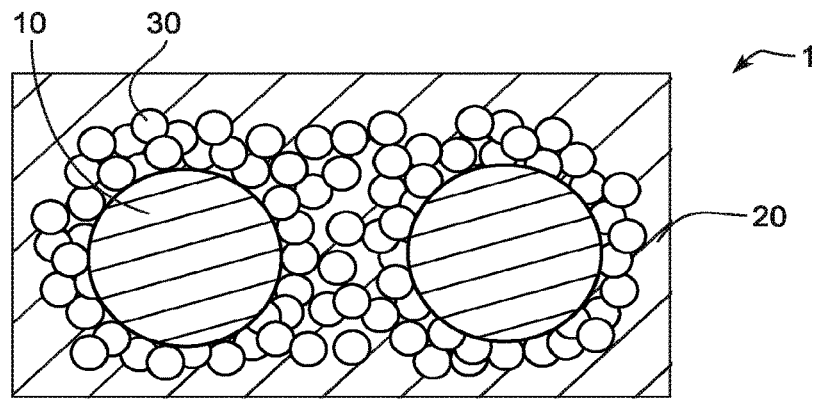
FIG. 2 shows a cross-sectional view of a portion of magnetic nanocomposite according to one embodiment of the invention.

As illustrated in FIG. 2, the nanocomposite 1 according to the first aspect of the invention substantially comprises:

Magnetic alloy nanoparticles 10,
An insulating or resistive matrix 20, and
Insulating nanoparticles 30.

The magnetic alloy nanoparticles 10 are at least partially comprised of a soft magnetic alloy, for example a nickel- and iron-based alloy such as permalloy or supermalloy, for example having the formula $Ni_{80}Fe_{17}Mo_3$, in particular marketed in powder form. They can also be comprised of an iron-based alloy, such as an iron-nickel alloy (rich in iron), a cobalt-based alloy, an iron- and cobalt-based alloy, or a nickel-based alloy such as a nickel-iron alloy (rich in nickel), with potentially one or more alloy additions, in particular chosen from among the following: aluminum Al, copper Cu, silicon Si, titanium Ti, tantalum Ta, molybdenum Mo, boron B, carbon C and nitrogen N.

The matrix 20 can comprise a polymer, such as polystyrene or polyethylene (e.g. PET), polyester, polymethylene (e.g. PMMA, PEO), polyurethane, polyvinylidene (e.g. PVDF, P(VDF-TrFE)), polyepoxide, or their derivatives and copolymers.

Insulating (non-magnetic) nanoparticles 30 can comprise polymer nanoparticles such as polystyrene and/or polyester, and/or silica-, alumina- or metal oxide-based nanoparticles such as titanium dioxide. Insulating (slightly magnetic) nanoparticles 30 can comprise nanoparticles having nickel-based (NiO), cobalt-based ($Co_3O_4$), or iron oxide-based ferrite nanoparticles ($Fe_2O_3$).

The nanoparticles 10, 30 are supported in the matrix 20.

The insulating nanoparticles 30 are inserted between the magnetic alloy nanoparticles 10. For example, several insulating nanoparticles 30 encapsulate, cover or coat at least partially each magnetic alloy nanoparticle 10. As illustrated in FIG. 2, each external surface element of each magnetic alloy nanoparticle 10 is not necessarily in contact with the insulating nanoparticles 30. The spacing apart of the magnetic alloy nanoparticles 10 from each other as a result of the insulating nanoparticles 30, to ensure the electrical insulation of the former is sufficient.

The production of electrical conduction pathways having a length that is a multiple of the diameter of the soft particles 10 is thus prevented, and the nanocomposite 1 resolves the problem of supplying a magnetic material that has a significant high-frequency permeability and that is a good electrical insulator.

According to one advantageous alternative, all or part of these insulating nanoparticles 30 not having magnetic properties or having slightly magnetic properties (ferrimagnetic characteristics) can be replaced by insulating nanoparticles having ferromagnetic properties in particular allowing for an increase in the permeability of the nanocomposite 1, while preserving its nature as a good electrical insulator.

Figure 3:
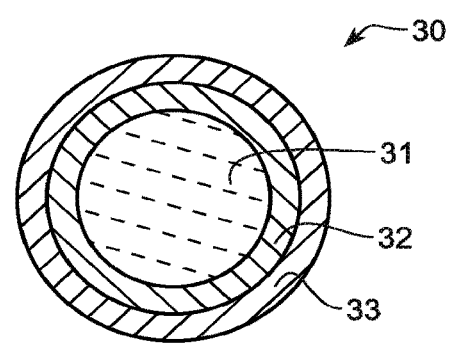
FIG. 3 shows a cross-sectional view of a hard ferromagnetic nanoparticle according to one embodiment of the invention.

Indeed, as illustrated in FIG. 3, at least one insulating nanoparticle 30 can comprise a core 31 comprised of a ferromagnetic element, a first shell 32 encapsulating the core 31 and a second shell 33 made from an insulating material encapsulating the first shell 32.

The first shell 32 being, for example, made from carbon or graphene, in particular allows the core 31 to be protected from oxidation. The core 31 and the first shell 32 form, for example, a hard Co/C particle. This can also involve Fe/C or Ni/C nanoparticles. Advantageously, the first shell 32 can also allow for surface functionalization enabling the subsequent grafting of the second shell 33.

The second shell 33 is, for example, comprised of a non-conductive polymer, such as polystyrene, a polyethylene-, polyester-, polymethylene-, polyurethane-, polyvinylidene-, polyepoxide-, polybutadiene-, or polymethacrylate-based polymer or polystyrene-methacrylate copolymers. The second shell 33 is intended to enable each hard particle 30 to be electrically insulated. The core 31, the first shell 32 and the second shell 33 form an insulating nanoparticle 30, also called a "functionalized hard particle" hereafter.

The nanocomposite 1 according to this advantageous alternative is in particular characteristic in the sense that it comprises at least two separate magnetic nanoparticle populations; the proportions between said two populations contributing to enabling the modulation of the high permeability and the high usage frequency of the nanocomposite 1 that they partially compose.

The use of functionalized hard particles 30 is also advantageous in that the latter tend to spontaneously aggregate by magnetostatic coupling around the soft particles 10 to better coat the latter.

The representation chosen in FIG. 2 should be viewed as relatively realistic in the sense that the nanoparticles 10, 30 of the nanocomposite 1 have specific characteristic dimensions. In particular, the nanoparticles 10, 30 are preferably spherical in shape.

It should firstly be noted that the nanoparticles 10, 30 have a dimension that is greater than the superparamagnetic limit, i.e. in simpler terms, a mean diameter that is greater than 5 nm. An upper threshold of this mean diameter can be imposed to form an upper limit to the length of the induced micro-currents, i.e. for example a mean diameter of less than 200 nm.

With regard to the core 31 of the hard particles protected from oxidation by the first shell 32, a lower limit equal to 10 nm and an upper limit equal to 70 nm can be applied. The second shell 33 has a nanometric thickness, for example between 2 and 10 nm, preferably equal to 4 nm. Preferably, the mean diameter of the functionalized hard particles 30 is between 20 and 50 nm. These limits are those routinely obtained using known industrial manufacturing processes.

With regard to the soft particles 10, they are preferably larger in size and large-diameter particles are advantageous in that they each have a multiplicity of magnetic domains. Thus, if the use of soft particles 10 having a minimum diameter equal to 50 nm is being considered, a lower limit equal to 100 nm should preferably be imposed for the mean diameter of the soft particles. The diameter of the soft particles 10 is therefore preferably between 100 and 200 nm.

The representation chosen in FIG. 2 should also be viewed as relatively realistic in the sense that the nanocomposite 1 is preferably formed from a low number of soft particles 10 and a high number of insulating nanoparticles 30. The challenge is to obtain good coverage of the soft particles 10 that are not electrically insulated, by the insulating nanoparticles 30, and to simultaneously comply with advantageously industrial manufacturing conditions.

Indeed, a certain number of insulating nanoparticles 30 is required to coat a soft particle 10. This number strongly depends on the ratio of their respective mean diameters. The ratio of the diameter of the soft magnetic alloy nanoparticles 10 over the diameter of the insulating nanoparticles 30 is considered hereafter. For example, for a value of the aforementioned ratio equal to 1, at least 9 insulating nanoparticles 30 are required to coat one soft particle 10; for a ratio equal to 2, about 15 insulating nanoparticles 30 are required; and for a ratio equal to 10, approximately one hundred are required.

A corresponding estimation of the proportions by mass of the populations of nanoparticles 10, 30 relative to each other can be given by way of example. For example, for a total particle mass of 1 g:
- a ratio of their respective mean diameters equal to 1 infers a mass of insulating nanoparticles equal to 940 mg and therefore a mass of soft particles equal to 60 mg;
- a ratio of their respective mean diameters equal to 2 infers a mass of insulating nanoparticles equal to 750 mg and therefore a mass of soft particles equal to 250 mg;
- a ratio of their respective mean diameters equal to 3 infers a mass of insulating nanoparticles equal to 660 mg and therefore a mass of soft particles equal to 340 mg;
- a ratio of their respective mean diameters equal to 5 infers a mass of insulating nanoparticles equal to 340 mg and therefore a mass of soft particles equal to 660 mg; and
- a ratio of their respective mean diameters equal to 10 infers a mass of insulating nanoparticles equal to 200 mg and therefore a mass of soft particles equal to 800 mg.

It can therefore be observed that, for a size ratio less than or equal to 1, very low proportions by mass of soft particles 10 must be used; conversely, for a size ratio greater than 10, very high proportions by mass of soft particles 10 must be used. These two extreme cases are not particularly advantageous in terms of the reliability and reproducibility of the method for producing the nanocomposite 1. It is therefore preferable that the size ratio be between 2 and 10. Within this range, it can be observed that, for a size ratio greater than or equal to 5, the mass of soft particles becomes dominant; however, in a solution comprising a mass of soft particles 10 greater than the mass of insulating nanoparticles 30, the soft particles have the tendency to settle quickly. It is therefore particularly advantageous to restrict oneself to a ratio of the diameter of soft particles 10 over the diameter of insulating nanoparticles 30 of between 2 and 4. Correspondingly, it appears advantageous to restrict oneself to a ratio of the mass of insulating nanoparticles 30 over the mass of soft particles 10 that is greater than 1 and/or less than 6.

The nanocomposite 1 obtained within the limits outlined hereinabove can advantageously take on the shape of at least one film with a thickness between 0.1 μm and 100 μm, and advantageously between 1 and 20 μm. The nanocomposite 1 obtained within the limits outlined hereinabove can have a mass fraction of metal equal to at least 50% and advantageously 70%, or even 90%, and/or a volume fraction of metal equal to at least 15%, and advantageously 20%, or even 25%, which is advantageously close to the theoretical maximum.

One specific functional embodiment of the production method 1000 for producing a nanocomposite 1 as described hereinabove will now be described.

Figure 4:
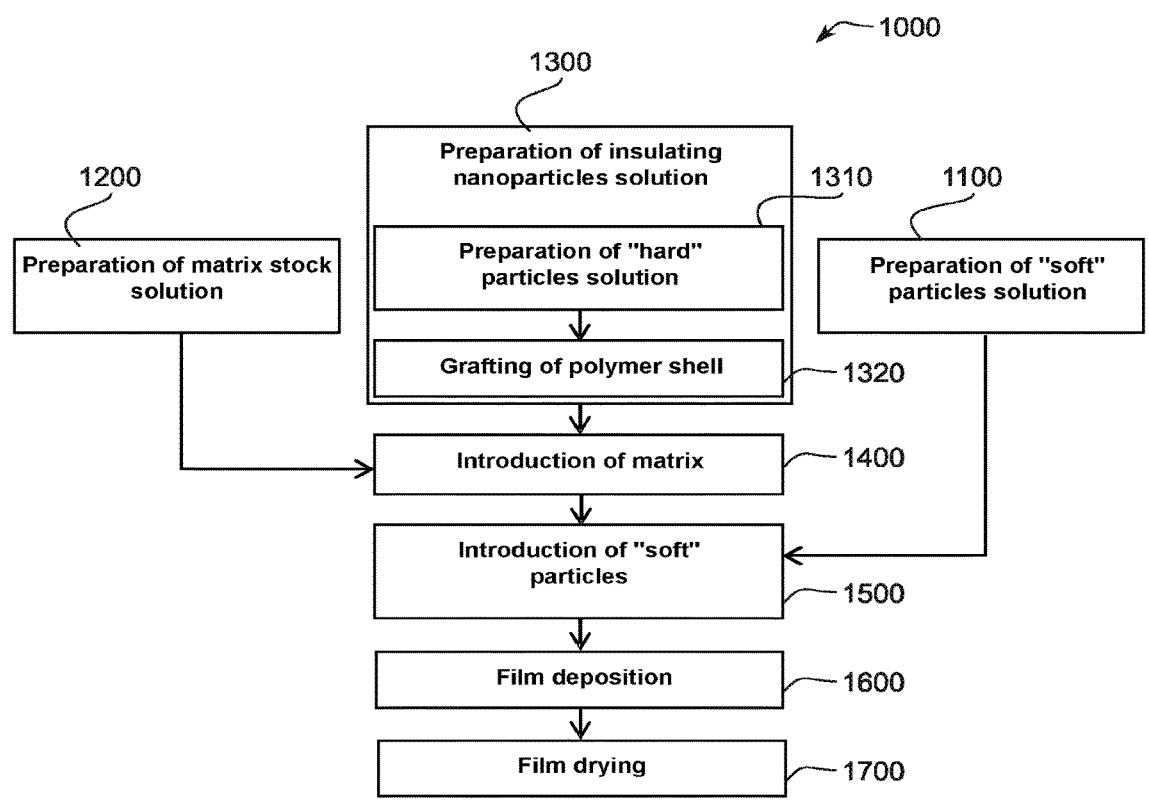
FIG. 4 shows a logic diagram of the method for producing a nanocomposite according to one embodiment of the invention.

Substantially, and as shown in FIG. 4, the production method 1000 for producing the nanocomposite 1 comprises:
- A preparation 1100 of a solution of soft magnetic alloy nanoparticles 10,
- A preparation 1200 of a stock solution of an insulating or resistive matrix 20,
- A preparation 1300 of a solution of insulating nanoparticles 30,
- A first mixing 1400 of the stock solution of the matrix 20 and the solution of insulating nanoparticles 30, and
- A second mixing 1500 of the solution of soft magnetic alloy nanoparticles 10 and the first mixture.

It can further comprise:
- A deposition 1600 of a film of the second mixture in particular on a wafer made from a semi-conductive material for example by spin coating, and
- A drying 1700 of the film in particular on a hot plate.

Without prejudice to the scope of the appended claims, one particularly functional embodiment of the method according to the invention, and more particularly of each of the steps 1100 to 1700, is provided hereinbelow. In particular, all numbers provided below to describe each of the steps 1100 to 1700 are provided by way of example only.

The example described hereinbelow is based on an initial mass of metal powder of 1 g, including 200 mg of soft particles 10 and 800 mg of hard particles; this proportion by mass corresponds to a ratio of the diameter of the soft particles 10 over the diameter of the hard particles that is equal to 2, so as to be able to satisfactorily coat the soft particles 10 with the functionalized hard particles 30. The solution prepared has a volume of 20 mL.

According to the example, the purpose of the preparation 1100 of the solution of soft particles 10 is to suspend said particles in a solvent, such as chloroform or anisole (8 mL). It can more particularly consist of suspending a mass of 200 mg of a powder of particles with the formula $Ni_{80}Fe_{17}Mo_3$ having a mean diameter of 70 nm to obtain a diluted solution, for example at a concentration equal to 0.025 g/mL. This suspension is preferably produced by sonication, for example by immersing an ultrasonic probe directly into the solution. The soft particles 10 tend to aggregate less than the hard particles. Moreover, conversely to the hard particles, they are not protected from oxidation. Therefore, the sonication time can advantageously be limited to 2 min. Furthermore, the sonication power can reach 200 W, without the soft particles 10 becoming damaged. The result of this preparation 1100 is a homogeneous suspension of soft particles 10 having a sedimentation time that is limited to a few minutes. Given this short sedimentation time, the preparation 1100 of the solution of soft particles 10 should ideally take place after the first mixing 1400.

According to the example, the preparation 1200 of the stock solution of the matrix 20 can consist in dissolving 3 g of polystyrene granules, having a molar mass equal to 35 kg/mol, in a chloroform or anisole solvent (4 mL) to obtain a translucent polystyrene solution at a concentration equal to 0.75 g/mL. A dissolution time exceeding 12 h, or even 24 h is preferable in order to obtain a homogeneous solution. For the same purpose, dissolution preferably takes place in an ultrasonic bath; the use of an ultrasonic probe directly immersed in the solution is not excluded, however nor is it necessary. The solution obtained will be used as a base for the final coating matrix 20 of the nanocomposite 1.

According to the example, the purpose of the preparation 1300 of a solution of insulating nanoparticles 30 is to suspend 1310 hard particles in a solvent and graft 1320 an insulating shell 33 around the hard particles in suspension.

The suspension 1310 can more particularly consist of suspending, in chloroform or anisole (8 mL), a mass of 800 mg of a dry powder of Co/C particles having a mean diameter of 30 nm to obtain a concentrated solution, for example at a concentration equal to 0.1 g/mL. The hard particles tend to aggregate as a result of the very high magnetostatic interactions with each other. It is therefore preferable, if not necessary, in order to obtain a homogeneous suspension, to use a sonication method, in particular using an ultrasonic probe immersed directly in the solution. It has been demonstrated that optimal sonication conditions, not resulting in the degradation of the carbon protective shell 32 protecting the hard particles, correspond to a sonication power of 100 W capable of being continuously maintained for 30 min. The optimal sonication time for this step 1310 is 10 min. Pulse sonication is also possible. The result is a homogeneous suspension of Co/C nanoparticles, the sedimentation time of which is about 5 to 7 min, which allows for the performance of the subsequent grafting step 1320 for grafting the insulating shell 33.

The grafting 1320 of the insulating shell 33 must take place directly after the suspension 1310 of the hard particles, before the latter settle. The grafting 1320 can consist in introducing 10 mg of a functionalizing polymer, i.e. 0.625 g/L, into the homogenized suspension of Co/C nanoparticles. The functionalizing polymer can comprise at least one styrene or anthracene termination, such as polystyrene, polybutadiene, polymethacrylate and polystyrene-methacrylate copolymers. The functionalizing polymer can consist of pyrene-terminated polystyrene having a molar mass equal to 5.6 kg/mol. Each chain of this polymer advantageously has a pyrene group that creates $\pi$-$\pi$ interactions with the carbon surface of the Co/C nanoparticles. This therefore involves a non-covalent grafting that does not damage the carbon protective layer 32 and that keeps the strong magnetization of the Co/C nanoparticles. The molar mass of the functionalizing polymer used has been chosen in order to obtain a thin electrical insulation shell 33, for example having a thickness equal to 4 nm. During the grafting 1320, sonication is preferably maintained for 10 min at a power of 100 W. The result is a stable solution of functionalized hard particles 30, each formed from a Co/C nanoparticle coated by a thin polystyrene shell 33. The functionalization of the surface and the difference in steric hindrance linked to the grafting 1320 of the shell 33 enable the functionalized hard particles 30 to reach a sedimentation time equal to 30 min. Therefore, the immediate performance of the subsequent steps of the method 1000 is not critical.

According to the example, the first mixing 1400 of the stock solution of the matrix 20 and the solution of insulating nanoparticles 30 consists of introducing the stock solution of the matrix 20 into the solution of functionalized hard particles 30. During the first mixing 1400, sonication is preferably maintained for a time equal to 10 min at a power equal to 100 W. The product of the first mixing 1400 is a viscous solution in which the functionalized hard particles 30 are in suspension in the medium of the matrix 20. The addition of the medium of the matrix 20 increases the sedimentation time, which reaches a value of about 75 min, which provides significant flexibility for the performance of the second mixing 1500 of the solution of soft particles 10 with the first mixture. Therefore, the preparation 1100 of the solution of soft particles 10, the sedimentation time of which is relatively short due to the relatively large size of said particles, can easily be performed after the first mixing 1400 and before the latter has had the time to settle.

According to the example, the second mixing 1500 of the solution of soft particles 10 and the first mixture consists of introducing the solution of soft particles 10 into the first mixture. The second mixing 1500 consists more particularly of adding the prepared solution of soft particles 10 after the first mixing 1400 before the soft particles 10 have had the time to settle, and in particular within a period of time that is less than 10 min, preferably less than 3 min, after the preparation 1100 of the solution of soft particles 10. Therefore, the soft particles 10 that are large in size are effectively incorporated, without significant loss due to sedimentation, into the stable solution of functionalized hard particles 30 in suspension in the medium of the matrix 20. The second mixture remains naturally in suspension long enough to allow for a spontaneous aggregation of the functionalized hard particles 30 all around the soft particles 10 by magnetic coupling and thus obtain a nanocomposite 1 as illustrated in FIG. 2. It is preferable, however not necessary, to maintain sonication during the second mixing 1500 for about ten minutes at a power equal to 100 W to encourage the homogenization of the second mixture. At the end of this step, a homogeneous and stable solution of the nanocomposite 1 is produced, having in particular an effective volume of 20 mL loaded with 0.125 g/mL of nanoparticles 10, 30 and with 0.15 g/mL of matrix polymer. At these concentrations, the sedimentation time of the nanoparticles 10, 30 and in particular of the soft particles 30 is greater than 30 min, which is sufficient to allow for the deposition 1600 of a film of the second mixture, for example on a wafer made of a semi-conductive material by spin coating.

According to the example, the deposition 1600 takes place from the spreading of a volume of the second mixture of between 1 and 3 mL, dispensed in the form of a droplet at the center of a rotating wafer made of a semi-conductive material. The conventional conditions for this deposition by spin coating correspond to a constant acceleration of 5000 rpm/s, a total duration equal to 60 s and a rotational speed of between 500 and 2000 rpm. The films produced have a typical thickness of several microns. Larger thicknesses of up to 20 μm or more can be achieved by double-layering. At the end of the deposition 1600, a uniform film is provided on the entire surface of the wafer, said surface capable of having a diameter of up to 200 mm. The film is characterized by a good homogeneity throughout its thickness in the distribution of nanoparticles 10, 30. As stipulated hereinabove, the film produced has a mass fraction of metal equal to 70%, i.e. a volume fraction of metal of about 20%. These characteristics meet the high permeability and high resistivity performance levels sought.

According to the example, the drying 1700 of the film takes place on a hot plate for 10 min at a temperature equal to 65° C. or 150° C. depending on whether the solvent used is chloroform or anisole.

After drying 1700, the smoothing of the film of the nanocomposite 1 by planarization and/or its transfer can also be considered. Indeed, the film can further undergo a shaping process dedicated to dry films, and in particular hot pressing.

It should be noted that, when the insulating nanoparticles 30 are simple in that they do not have magnetic properties or have slightly magnetic properties (magnetic oxides), the preparation 1300 of their solution comprises their suspension in a solvent, said suspension falling with the normal capacities of one of ordinary skill in the art. The subsequent steps of the production method 1000 are mutatis mutandis the same as those described hereinabove according to the example provided, whereby the suggested modifications fall within the normal capacities of one of ordinary skill in the art.

The invention further relates to a microelectronic component or device for an integrated circuit operating at a high frequency, and in particular a micro-inductor, comprising a nanocomposite according to the first aspect of the invention.

The invention further relates to the use of a nanocomposite according to the first aspect of the invention in a microelectronic component or device for an integrated circuit operating at a high frequency, and in particular a micro-inductor.

More particularly, a micro-inductor according to the invention can comprise at least one portion of a coil or winding made of a conductive material at least partially embedded within a nanocomposite 1 according to the first aspect of the invention.

The coil, for example made of copper of aluminum, can be planar or three-dimensional and can comprise connection members. For example, winding portions can be positioned in separate planes of a device that is potentially semiconductive and joined in pairs by connection members such as vias to form a continuous element wound about itself.

For example, the coil can be deposited, for example by electrodeposition, on a substrate, such as a wafer, potentially covered by a dielectric material, such as silica. A part of the dielectric material and/or of the substrate can be etched by conventional means, for example by dry or wet etching, to form a housing in which the coil is suspended; support bars can be used to maintain the coil in suspension inside the housing. The housing is then at least partially filled with a volume of the second mixture 1500. After drying this volume of mixture, at least part of the micro-inductor according to the invention is obtained.

The invention claimed is:

1. A nanocomposite, comprising:
   magnetic alloy nanoparticles at least partially comprised of a soft magnetic alloy and comprising at least two magnetic domains,
   an insulating matrix supporting the magnetic alloy nanoparticles, and
   insulating nanoparticles supported by the insulating matrix, wherein the insulating nanoparticles are inserted between the magnetic alloy nanoparticles so as to space apart the magnetic alloy nanoparticles from one another and ensure electrical insulation of the magnetic alloy nanoparticles from one another,
   wherein the nanocomposite has a relative permeability $\mu_R$ which is greater than 2 at frequencies of 1 GHz or greater.

2. The nanocomposite according to claim 1, wherein the ratio of the diameter of the magnetic alloy nanoparticles over the diameter of the insulating nanoparticles is between 1 and 10.

3. The nanocomposite according to claim 1, wherein the diameter of the magnetic alloy nanoparticles is between 100 nm and 200 nm.

4. The nanocomposite according to claim 1, wherein the diameter of the insulating nanoparticles is between 10 nm and 70 nm.

5. The nanocomposite according to claim 1, wherein the magnetic alloy nanoparticles are comprised of an alloy chosen from among the following: a nickel- and iron-based alloy, an iron-based alloy, a cobalt-based alloy, and an iron- and cobalt-based alloy, potentially with one or more alloy additions, chosen from among the following: aluminum Al, copper Cu, silicon Si, titanium Ti, tantalum Ta, molybdenum Mo, boron B, carbon C and nitrogen N.

6. The nanocomposite according to claim 1, wherein at least one insulating nanoparticle comprises a core comprised of a ferromagnetic element, a first carbon or graphene shell encapsulating the core and a second polymer shell.

7. The nanocomposite according to claim 1, wherein the insulating matrix comprises a non-conductive polymer, which is selected from the group consisting of polystyrene, polybutadiene, polymethacrylate, polystyrene-methacrylate copolymers, and polyethylene-, polyester-, polymethylene-, polyurethane-, polyvinylidene-, and polyepoxide-based polymers.

8. The nanocomposite according to claim 1, having a form of at least one film having a thickness of between 0.1 μm and 100 μm, and having a mass fraction of metal at least equal to 50% and/or a volume fraction of metal at least equal to 15%.

9. A production method for producing the nanocomposite according to claim 1, the production method comprising:
   preparing a solution of magnetic alloy nanoparticles at least partially comprised of a soft magnetic alloy,
   preparing a stock solution of an insulating matrix,
   preparing a solution of insulating nanoparticles,
   a first mixing of the stock solution of the insulating matrix and the solution of insulating nanoparticles,
   a second mixing of the solution of magnetic alloy nanoparticles and the first mixture, and
   preparing the solution of magnetic alloy nanoparticles comprising the suspension of the magnetic alloy nanoparticles in a solvent by sonication.

10. The production method according to claim 9, wherein the solution of magnetic alloy nanoparticles has a mass concentration of between 0.01 and 0.05 g/mL, and/or the solution of insulating nanoparticles has a mass concentration of between 0.05 and 0.2 g/mL.

11. The production method according to claim 9, wherein the sonication applied to the solution of magnetic alloy nanoparticles has a sonication power between 100 and 250 W, and a sonication time of less than 10 min.

12. The production method according to claim 9, wherein preparing the solution of magnetic alloy nanoparticles takes place after the first mixing.

13. The production method according to claim 9, wherein, each insulating nanoparticle comprising a core comprised of a ferromagnetic element such as cobalt Co, iron Fe or nickel Ni, a first carbon or graphene shell encapsulating the core and a second polymer shell, such as polystyrene, encapsulating the first shell, the preparation of the solution of insulating nanoparticles comprises:

suspending nanoparticles each comprising said core and said first shell in a solvent by sonication at a power between 50 and 150 W, and for a time of less than 30 min, then grafting said second shell onto each nanoparticle previously suspended by the introduction of a functionalizing polymer comprising at least one styrene or anthracene termination, while maintaining sonication at a power of between 50 and 150 W, and for a time that is less than 30 min.

14. The production method according to claim 13, wherein the first mixing of the stock solution of the insulating matrix and the solution of insulating nanoparticles takes place by introducing the stock solution of the insulating matrix into the solution of insulating nanoparticles, the sonication thereof being maintained at a power of between 50 and 150 W and for a time that is less than 30 min.

15. The production method according to claim 14, wherein the second mixing of the solution of magnetic alloy nanoparticles and the first mixture takes place within a lapse of time that is less than 10 min, after the preparation of the solution of magnetic alloy nanoparticles, the sonication of the first mixture being maintained at a power of between 50 and 150 W, and for a time that is less than 30 min.

16. The production method according to claim 9, wherein sonication takes place by immersing an ultrasonic probe directly into the concerned solution.

17. The production method according to claim 9, further comprising:

depositing a film of the second mixture, and drying the film in particular on a hot plate.

18. The nanocomposite according to claim 1, wherein at least one insulating nanoparticle has ferromagnetic properties.

19. The nanocomposite according to claim 1, wherein at least one insulating nanoparticle comprises a core comprised of a ferromagnetic element, a first shell encapsulating the core, and a second shell made from an insulating material encapsulating the first shell.

20. The nanocomposite according to claim 1, wherein:

the insulating matrix comprises a non-conductive polymer; and the insulating matrix has an uniform chemical composition throughout the nanocomposite.

\* \* \* \* \*